UNITED STATES PATENT OFFICE.

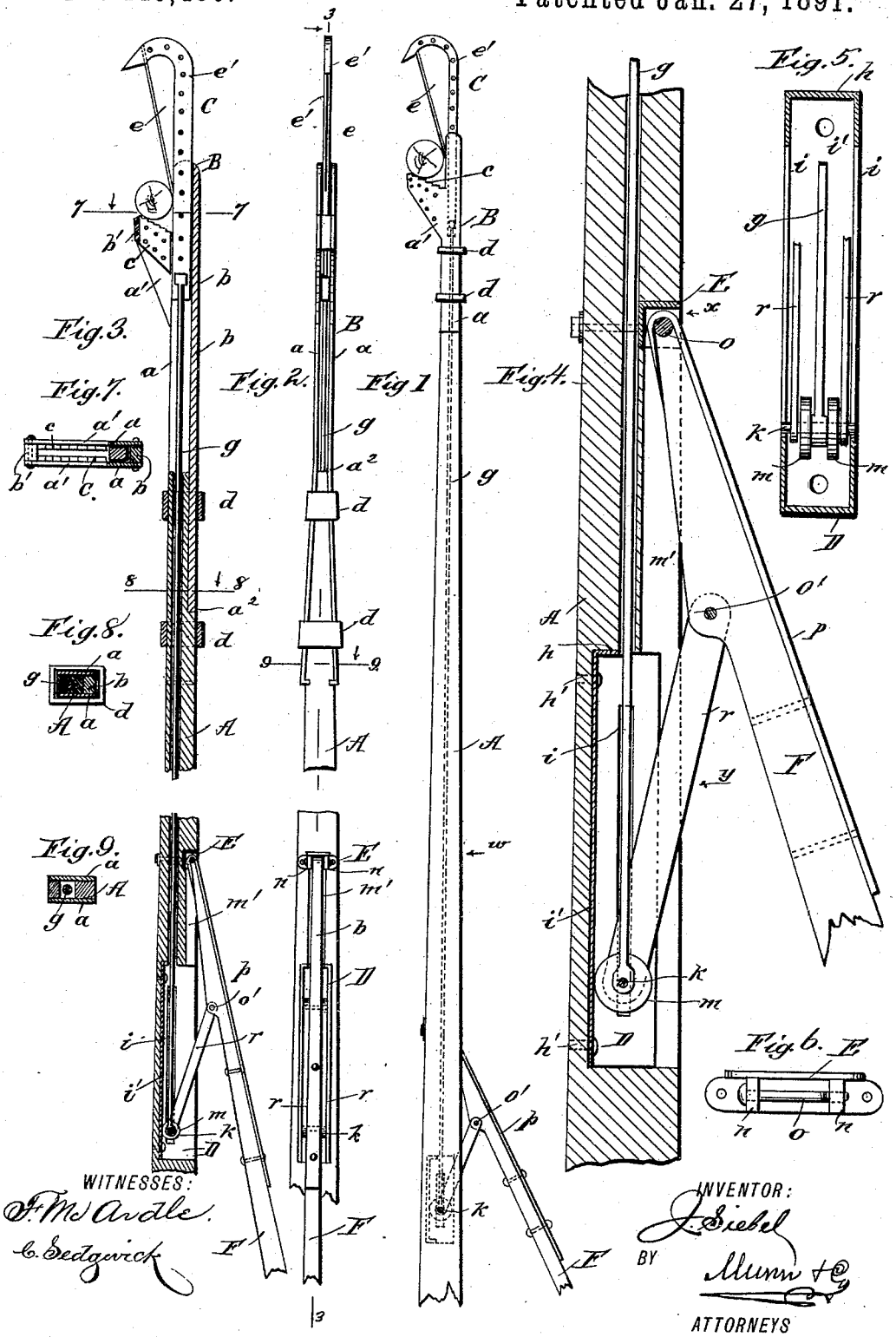

JOHN SIEBEL, OF OSKALOOSA, IOWA.

PRUNING IMPLEMENT.

SPECIFICATION forming part of Letters Patent No. 445,480, dated January 27, 1891.

Application filed July 7, 1890. Serial No. 357,978. (No model.)

*To all whom it may concern:*

Be it known that I, JOHN SIEBEL, of Oskaloosa, in the county of Mahaska and State of Iowa, have invented a new and useful Pruning Implement, of which the following is a full, clear, and exact description.

This invention relates to improvements in a device for pruning trees and shrubbery from the ground, and has for its object to provide a simple compact implement which may be effectively operated with ease and rapidity to remove branches or small limbs without injury to the tree.

To these ends my invention consists in the construction and combinations of parts, as hereinafter described and claimed.

Reference is to be had to the accompanying drawings, forming a part of this specification, in which similar letters of reference indicate corresponding parts in all the figures.

Figure 1 is a side elevation of the implement, having the lower portion of its pole and swinging lever broken. Fig. 2 represents the parts of the device shown in Fig. 1 enlarged and in a different position, that is indicated by the arrow $w$ in Fig. 1. Fig. 3 is a longitudinal section of the parts shown in the preceding figures, taken on the line 3 3, Fig. 2. Fig. 4 is an enlarged longitudinal section of the device, embracing the parts shown in the lower broken portion of Fig. 3. Fig. 5 is a face view of the parts opposite the arrow $y$ in Fig. 4, viewed in the direction indicated by said arrow. Fig. 6 is a face view of the piece shown in section in Fig. 4, opposite the arrow $x$, viewed in the direction of said arrow. Fig. 7 is a plan in section taken on the line 7 7 in Fig. 3. Fig. 8 is a plan in section taken on the line 8 8 in Fig. 3, and Fig. 9 is a plan view taken on the line 9 9 in Fig. 2.

A pole A, preferably made of wood that is light, tough, strong, and not liable to warp from a straight condition, is provided, of sufficient length to reach twigs or small branches on a tree of moderate height.

The pole A should be given a suitable taper toward the upper end for the reception of working parts of the implement and also to avoid unnecessary weight near the upper end.

The stock B, wherein the knife moves, is formed of two similar plates $a$, on one edge of which the upwardly and outwardly projecting spurs $a'$ are formed integrally, and, as shown in Fig. 7, the side plates $a$ and spurs $a'$ of the stock are held spaced apart by the blocks $b\ b'$, to which said plates are secured by bolts or rivets. Between the blocks $b\ b'$ the plates $c$ are attached to the spurs $a'$ and form a part of these projections. Teeth which slope toward the upright portion of the side plates $a$ are cut on the top edges of the plates $c$, which are designed to retain in place a twig or branch that is to be severed by the implement.

The spacing-block $b$ is extended downwardly as a back plate for the side plates $a$ to a point $a^2$, where the side plates are separated and commence to diverge, so as to fit the tapering upper end of the pole, the plates being bent at a right angle toward each other to fit into grooves cut across the pole-body, as shown in Fig. 2; and to secure the side plates in position properly aligned with the pole two ferrules $d$ are provided, which may be driven over the plates and pole-end portion, so that the parts will be held bound together in an obvious manner.

The pruning-knife C is comprised of a flat thin blade $e$, which is held rigid by two similar re-enforce plates $e'$, that are riveted or screwed to the thin cutting-blade near its rear edge as clamps upon its sides. The re-enforce plates being straight for a considerable portion of their length, considered from their lower ends upwardly, are bent edgewise into hook form at their upper ends, and the cutting-edge of the blade $e$ is made to subtend the bowed part of the re-enforce plates, so as to afford an outwardly and upwardly inclined free edge. (Shown in Figs. 1 and 3.)

The thickness of the composite pruning-knife C is so proportioned that it will slide neatly within the space between the side plates $a$ of the stock B and the knife-blade $e$, between the toothed plates $c$, in like manner.

A longitudinal perforation is made in the pole-body A of suitable length and at a proper point, diametrically considered, for the introduction and free reciprocal movement therein of a connecting-rod $g$, that is removably interlocked with the lower portion of the pruning-knife C by a lateral sliding engagement of a T-head on the upper end of the rod, with a mating slot formed in the re-enforce plates e' of the knife.

A longitudinal channel or excavation is produced in the side of the pole A at a required point for the reception of a rectangular box-shaped frame D, which is embedded in the channel and therein secured, having an abutment of its top wall h with the upper terminal wall of the channel, as shown in Fig. 4, the lower end of the frame being similarly engaged with the lower end wall of the channel, so that the frame is held from endwise movement by the insertion of small screws into the wall of the pole, as at h' in said figure.

At directly opposite points in the side walls of the frame D the guide-slots i are formed, which slots are intended to receive the loosely-fitting ends of a short transverse shaft k, that forms a pivot for the lower end portion of the connecting-rod g, two anti-friction wheels m being mounted on the shaft, one on each side of the connecting-rod end, on which they loosely bear sidewise.

At a proper point above the frame D a transversely-located bracket-plate E is secured at the top of a longitudinal groove m', which is an upward extension from the channel that receives the frame D.

As shown in Fig. 6, the bracket-plate E is comprised of two flat pieces joined by one edge of each integrally, so as to form a right angle in cross-section. Suitably-spaced ears n are formed on the bracket-plate, which ears are laterally perforated with aligning holes, that receive a fulcrum-bolt o.

The lever F, made of wood or metal, is furnished with a strap p or other equivalent means for connecting its upper end with the bolt o, so that the lever may be vibrated, said lever being made of a length that will permit it to be manipulated by an operator having the pole A in hand. Two link-plates r have their perforated lower ends placed upon the shaft k between the anti-friction wheels m and the side walls of the frame D, the upper ends of which link-plates are pivotally attached to the inner side of the lever F at a point o' properly removed from the fulcrum-bolt o. The diameter of the wheels m is proportioned to the distance between the slots i and the vertical wall i' of the frame D, so that the peripheries of the wheels will travel against the wall named and relieve the engaged ends of the shaft k from frictional contact with the slotted side walls of the frame.

In use the knife-blade e is raised into the position shown in Figs. 1 and 3 by the outward vibration of the lever F, when the spurs a may be placed below a limb that is to be severed, the teeth of the plates c having contact with the lower surface of the limb. The lever F is then moved toward the pole A by the operator, which movement will forcibly draw the inclined edge of the blade e against the limb with a shearing cut, that will sever the branch or limb with ease if its diameter is within the capacity of the implement to properly engage.

It will be seen that from the peculiar construction and arrangement of parts in this pruning implement great power may be exerted to draw the knife C downwardly, as the manner of connecting the lever to the knife affords a toggle-joint attachment between the vertical connecting-rod g and said lever, so that if proper length is given to the lever a moderate pressure exerted at its lower end to move it toward the pole A will be greatly increased in potential and limbs of considerable size may be cut off with ease, the draft of the knife-blade from above with the shearing cut greatly aiding the operation.

Having thus described my invention, I claim as new and desire to secure by Letters Patent—

The combination, with a pole, a knife-stock which is removable, a sliding knife within the stock, the stock having a toothed spur on one edge, through which a shear-cutting blade of the knife may slide, and the knife-blade provided with lateral re-enforce plates, which have bent upper portions that are secured to the shear-cutting blade and are adapted to slide above the spurs on the knife-stock, of a depending connecting-rod that slides through a longitudinal perforation in the pole, a frame embedded in the pole and laterally slotted to receive the ends of a cross-shaft, a transverse shaft, anti-friction wheels on the shaft, one on each side of the connecting-rod, which is loosely engaged by the shaft, two links pivoted at their lower ends to the shaft and by their upper ends to a lever, and a lever that is jointed at its upper end to the pole-body by a bracket-plate and adapted to swing laterally, substantially as set forth.

JOHN SIEBEL.

Witnesses:
C. W. JONES,
S. H. FOREMAN.